G. P. SMITH.
LANTERN SLIDE.
APPLICATION FILED SEPT. 12, 1913.
1,149,693.
Patented Aug. 10, 1915.
Fig. 1.
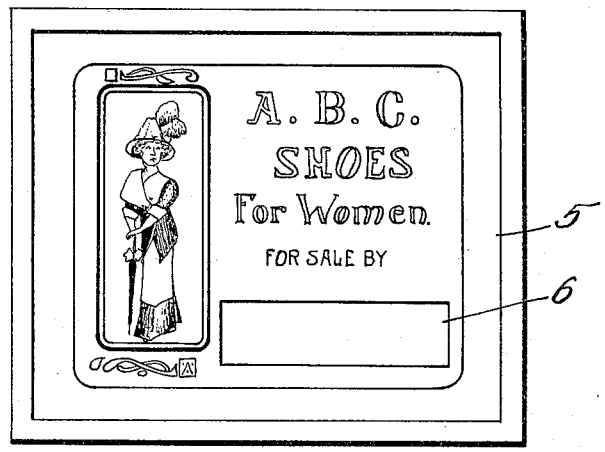
Fig. 2.
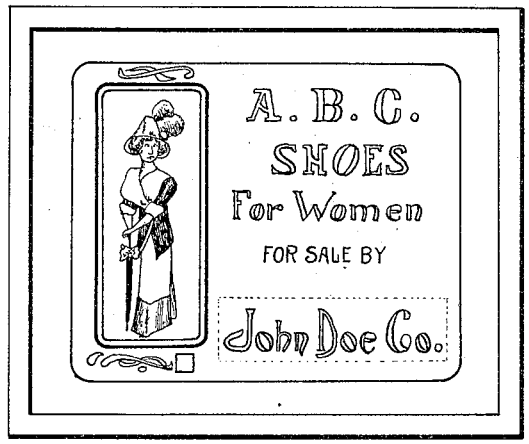
Fig. 4.
| John Doe Co. |
| --- |
| Richard Roe |
| Wm. Parker |
| F. MacGiffin |
7
Witnesses
W. C. Stein
B. Austine
Fig. 3
8
Inventor:
Guy P. Smith.
by Alfred W. Kicks Atty.
COLUMBIA PLANOGRAPH CO., WASHINGTON, D. C.

UNITED STATES PATENT OFFICE.

GUY P. SMITH, OF HIGHLAND TERRACE, MISSOURI.

LANTERN-SLIDE.

1,149,693. Specification of Letters Patent. Patented Aug. 10, 1915.

Application filed September 12, 1913. Serial No. 789,471.

*To all whom it may concern:*

Be it known that I, GUY P. SMITH, a citizen of the United States, and resident of Highland Terrace, St. Louis county, Missouri, have invented certain new and useful Improvements in Lantern-Slides, of which the following is a specification.

This invention relates to improvements in lantern slides and has for its object a slide of standard structure provided with a space in which is inserted a rubberized collodion photographic film on which is the name of the customer, the same when inserted being in harmony with the remainder of the plate so as to prevent detection of its insertion.

Figure 1 is a plan view of a slide showing the opening. Fig. 2 is a view of the same showing the name inserted. Fig. 3 is a detail perspective view of a rubberized collodion film of a size to be inserted in the space in the plate. Fig. 4 is a plan view of a film showing a number of names as photographed and as the collodion film appears after being removed from the photographic plate and ready to be cut to be inserted into the space in the plate.

Referring to the drawings 5 indicates an ordinary photographic plate on which appears the picture and the inscription of the article and on the plate is provided a space 6 which is clear of any film or inscription. These plates are made from an ordinary drawing or painting and of such number as is required by the party ordering the same; the object of constructing a plate of this character is to avoid the necessity of making a drawing or photograph of each individual plate, and by producing a plate of this character with an open space as indicated by the numeral 6 the same can be utilized by inserting in the space the name of the customer selling the article which is advertised and imprinted on the space in the plate above the name of the customer.

My invention is carried out by artistically drawing or painting the names of customers on a single sheet as that illustrated in Fig. 4 and taking a photograph of the same; the collodion film of the plate is removed and cut on the lines indicated by the numeral 7 in Fig. 4; one of these names is then inserted in the space 6 of the plate; the same may be of solid lettering or of a hollow lettering as may be found most desirable and before inserted in the space 6, the same is rubber coated and by the projection of the matter on the plate upon the screen the contents of the plate appear absolutely clear and uninterrupted and the insertion of the collodion film in this manner is un-noticed on the screen.

The essential feature of my invention is to first make a drawing or painting of a slide leaving a space for the insertion of the customer's name; these plates are made in quantities as desired by the purchaser and when the purchaser desires to furnish each customer with a slide for advertising purposes the name of the customer is inserted in the space by placing therein a strip 8, as shown in Fig. 3, of rubberized collodion film cut from a plate of a plurality of names photographed as shown in Fig. 4; these plates are then furnished to the proper customers and in this manner the ordinary form of inserting the names by type or the like is dispensed with and each plate appears on the screen as a specific and individual design without showing the insertion of the customer's name.

Having fully described my invention what I claim is:

In a lantern slide, a transparent plate, a film on said plate bearing a photographic representation, said film being provided with an opening, and a name-bearing rubberized collodion strip adapted to fit snugly in said opening, the matter on said film and said strip being adapted for projection, substantially as specified.

In testimony whereof, I have signed my name to this specification, in presence of two subscribing witnesses.

GUY P. SMITH

Witnesses:
ALFRED A. EICKS,
WALTER C. STEIN.

Copies of this patent may be obtained for five cents each, by addressing the "Commissioner of Patents Washington, D. C."